United States Patent
Nam

(10) Patent No.: US 9,419,834 B2
(45) Date of Patent: Aug. 16, 2016

(54) MPSK DEMODULATION APPARATUS AND METHOD

(71) Applicant: Electronics and Telecommunications Research Institute, Daejeon (KR)

(72) Inventor: Hong-Soon Nam, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 0 days.

(21) Appl. No.: 14/746,025

(22) Filed: Jun. 22, 2015

(65) Prior Publication Data

US 2016/0028570 A1     Jan. 28, 2016

(30) Foreign Application Priority Data

Jul. 25, 2014 (KR) ........................ 10-2014-0094536

(51) Int. Cl.
*H03D 3/22* (2006.01)
*H04L 27/22* (2006.01)
*H04L 7/033* (2006.01)

(52) U.S. Cl.
CPC .............. *H04L 27/22* (2013.01); *H04L 7/0331* (2013.01)

(58) Field of Classification Search
CPC ....... H04L 27/22; H04L 7/0331; H04L 27/18; H04L 27/227; H04L 27/233
USPC .................. 375/279–283, 329–333; 329/304, 329/306–310
See application file for complete search history.

(56) References Cited

U.S. PATENT DOCUMENTS

| 6,160,838 A * | 12/2000 | Shinohara .............. H04B 1/707 375/130 |
| 2006/0193401 A1 | 8/2006 | Lopez Villegas et al. |
| 2007/0110189 A1 | 5/2007 | Park et al. |
| 2007/0127601 A1 | 6/2007 | Park et al. |
| 2012/0269297 A1 | 10/2012 | Mishra et al. |

FOREIGN PATENT DOCUMENTS

| KR | 1020020019700 A | 3/2002 |
| KR | 1020070050634 A | 5/2007 |

OTHER PUBLICATIONS

L. E. Franks, "Carrier and Bit Synchronization in Data Communication—A Tutorial Review," IEEE Transactions on Communications, Aug. 1980, 1107-1121, vol. Com-28.

Mohamed-Slim Alouini et al., "A Unified Approach for Calculating Error Rates of Linearly Modulated Signals over Generalized Fading Channels," IEEE Transactions on Communications, Sep. 1999, 1324-1334, vol. 47 No. 9.

* cited by examiner

*Primary Examiner* — Phuong Phu
(74) *Attorney, Agent, or Firm* — William Park & Associates Ltd.

(57) ABSTRACT

An M-ary Phase Shift Keying (MPSK) demodulation apparatus and method are disclosed herein. The MPSK demodulation apparatus includes an amplifier, a carrier frequency recoverer, a plurality of correlators, and a symbol detector. The amplifier amplifies a received signal. The carrier frequency recoverer recovers a carrier frequency from the received signal, and generates a plurality of signals having a set phase difference. Each of the plurality of correlators outputs a signal, maintained at a set signal level for a specific period of time, using the received signal and the plurality of signals. The symbol detector collects the output signals of the plurality of correlators, and detects a received symbol by comparing the absolute value magnitudes of the collected output signals.

9 Claims, 5 Drawing Sheets

| BINARY INPUT | SYMBOL NO | PHASE |
|---|---|---|
| 000 | 6 | $5\pi/4$ |
| 001 | 5 | $\pi$ |
| 010 | 7 | $3\pi/2$ |
| 011 | 8 | $7\pi/4$ |
| 100 | 3 | $\pi/2$ |
| 101 | 4 | $3\pi/4$ |
| 110 | 2 | $\pi/4$ |
| 111 | 1 | 0 |

FIG. 5

MPSK DEMODULATION APPARATUS AND METHOD

CROSS-REFERENCE TO RELATED APPLICATION

This application claims the benefit of Korean Patent Application No. 10-2014-0094536, filed Jul. 25, 2014, which is hereby incorporated by reference herein in its entirety.

BACKGROUND

1. Technical Field

The present disclosure relates generally to an M-ary Phase Shift Keying (MPSK) demodulation apparatus and method and, more particularly, to an MPSK demodulation apparatus and method that determine a received symbol using a plurality of correlators in a wireless channel in which bandwidth is limited.

2. Description of the Related Art

Phase Shift Keying (PSK) is a transmission method that is chiefly used in a channel in which bandwidth is limited because its bandwidth efficiency is high, and is divided into Binary PSK (BPSK) and MPSK.

BPSK performs modulation and demodulation using a single frequency mixer. A modulation apparatus using BPSK uses a frequency, generated by its own frequency generator, as a carrier frequency. Furthermore, a demodulation apparatus using BPSK may use a coherent demodulation method that synchronizes and uses a carrier frequency and a phase from a received signal, or a non-coherent demodulation method that uses a frequency generated by its own frequency generator. In this case, although the coherent demodulation method imparts system performance that is superior to that of the non-coherent demodulation method, it is problematic in that complexity is required to recover carrier frequency and in that implementation becomes more difficult as carrier frequency increases.

In a low frequency communication environment, MPSK is required for bandwidth efficiency because the bandwidth used is narrow, and also a coherent demodulation method having excellent error performance is required. For example, Korean Patent Application Publication No. 10-2007-0050634 entitled "Apparatus and Method for improving Symbol Error Rate Performance of M-PSK System having Quadrature Error" discloses a technology that mitigates the degradation of symbol error rate attributable to quadrature error estimation and quadrature error during the demodulation of an M-PSK signal in a system to which an MPSK method has been applied.

MPSK uses a quadrature modulation and demodulation method that performs division into an I channel and a Q channel using two frequency mixers having a phase difference of $\pi/2$ and then performs modulation and demodulation. Although the quadrature modulation and demodulation method has the advantage of being implemented using two frequency mixers for I and Q channels regardless of the size of M, a more precise digital-to-analog convertor (DAC) and a more precise analog-to-digital convertor (ADC) are required as M increases.

Although a DAC can be implemented using a relatively simple level converter because a modulation apparatus performs conversion into a set size signal, a demodulation apparatus requires a more precise ADC. When a precise ADC is used, digital signal processing is facilitated. However, this case is disadvantageous in that a received signal must be amplified to a sufficient magnitude in order to convert an analog signal into a digital signal, noise figure (NF) increases in response to the degree of amplification, and also quantization noise occurs during a signal conversion process, so that signal to noise ratio (SNR) and system performance may be degraded.

In an MPSK demodulation apparatus, noise has Additive White Gaussian Noise (AWGN) characteristics. AWGN noise is problematic in that it increases in accordance with the bandwidth used, temperature and current consumption and, thus, degrades SNR.

SUMMARY

At least some embodiments of the present invention are directed to the provision of an MPSK demodulation apparatus and method that determine a received symbol using a plurality of correlators in a wireless channel in which bandwidth is limited.

In accordance with an aspect of the present invention, there is provided an M-ary Phase Shift Keying (MPSK) demodulation method, including: collecting, by an MPSK demodulation apparatus including a plurality of correlators, the output signals of the plurality of correlators; and detecting a received symbol by comparing the absolute value magnitudes of the collected output signals.

Detecting the received symbol may include: determining a correlator pair in which the absolute value signal difference between one correlator of the plurality of correlators and another correlator having a phase difference of 90 degrees is largest; determining a correlator having a higher magnitude signal by comparing the signal absolute value of the one correlator and the signal absolute value of the other correlator having a phase difference of 90 degrees, with respect to the determined correlator pair having the largest absolute value signal difference, based on the result of determining the correlator pair having the largest absolute value signal difference; and determining a received symbol by determining whether the signal of the correlator having a higher magnitude signal is a positive number or a negative number based on the result of determining the correlator having a higher magnitude signal.

The MPSK demodulation method may further include, before collecting the output signals: amplifying the received signal, recovering a carrier frequency from the amplified received signal, and generating a plurality of signals having a set value phase difference; and outputting the plurality of signals via the plurality of respective correlators.

Recovering the carrier frequency and generating the plurality of signals may include generating the plurality of signals by applying one of a phase locked loop (PLL), a square law loop and a Costas loop to the amplified signal.

In accordance with another aspect of the present invention, there is provided an MPSK demodulation apparatus, including: an amplifier configured to amplify a received signal; a carrier frequency recoverer configured to recover a carrier frequency from the received signal and generate a plurality of signals having a set phase difference; a plurality of correlators each configured to output a signal, maintained at a set signal level for a specific period of time, using the received signal and the plurality of signals; and a symbol detector configured to collect the output signals of the plurality of correlators and detect a received symbol by comparing the absolute value magnitudes of the collected output signals.

The symbol detector may determine a correlator pair in which the absolute value signal difference between one correlator of the plurality of correlators and another correlator having a phase difference of 90 degrees is largest, may determine a correlator having a higher magnitude signal by comparing the signal absolute value of the one correlator and the signal absolute value of the other correlator having a phase difference of 90 degrees, with respect to the determined correlator pair having the largest absolute value signal difference, based on the result of determining the correlator pair having the largest absolute value signal difference, and determines a received symbol by determining whether the signal of the correlator having a higher magnitude signal is a positive number or a negative number based on the result of determining the correlator having a higher magnitude signal.

The carrier frequency recoverer may generate the plurality of signals using one of a PLL, a square law loop and a Costas loop.

Each of the plurality of correlators may include: a frequency mixer configured to mix the received signal with the carrier frequency recovered by the carrier frequency recoverer; an integrator configured to select a low frequency signal from the output signal of the frequency mixer and integrate the selected low frequency signal over a symbol period; and a sample and hold circuit configured to sample the output signal of the integrator at the time at which a symbol terminates and maintain the result of the sampling at a set signal level for a specific period of time.

The amplifier may amplify the received signal using an amplifier whose noise index is lower than a reference value.

The symbol detector may detect the received symbol using a truth table and a constellation.

BRIEF DESCRIPTION OF THE DRAWINGS

The above and other objects, features and advantages of the present invention will be more clearly understood from the following detailed description taken in conjunction with the accompanying drawings, in which:

FIG. 5 is a diagram illustrating a truth table according to an embodiment of the present invention.

DETAILED DESCRIPTION

Figure 1:
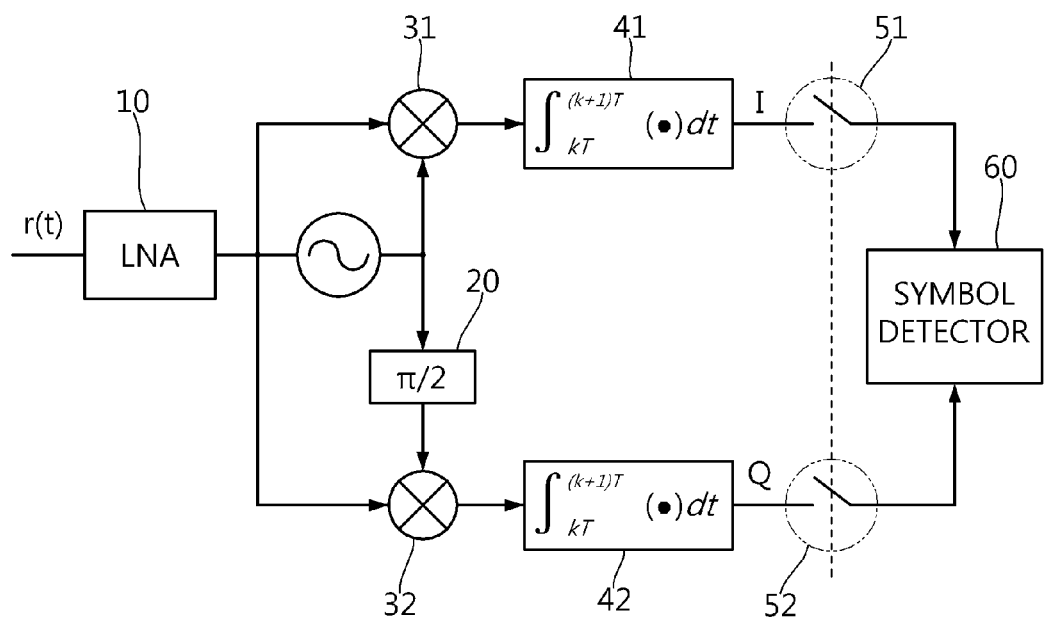
FIG. 1 is a configuration diagram illustrating an example of a general MPSK demodulation apparatus.

Embodiments of the present invention will be described in detail below with reference to the accompanying drawings. Redundant descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

An MPSK demodulation apparatus and method according to embodiments of the present invention are described in detail with reference to the accompanying diagrams.

FIG. 1 is a configuration diagram illustrating an example of a general MPSK demodulation apparatus.

First, the MPSK demodulation apparatus illustrated in FIG. 1 is an apparatus using a coherent demodulation method that recovers a carrier frequency from a received signal and receives a signal.

Referring to FIG. 1, the MPSK demodulation apparatus includes a low noise amplifier (hereinafter referred to as the "LNA") 10, a carrier frequency recoverer 20, mixers 31 and 32, integrators 41 and 42, samples and ADCs 51 and 52, and a symbol detector 60.

The LNA 10 corresponds to a preamplifier, and performs amplification at a low noise index.

The carrier frequency recoverer 20 recovers a carrier frequency using a method, such as a square law loop, a Costas loop, or the like. Furthermore, the carrier frequency recoverer 20 transfers the recovered signal over an I channel and a π/2-delayed signal over a Q channel.

Each of the mixers 31 and 32 mixes the received signal with the recovered clock.

Each of the integrators 41 and 42 integrates the signal and low frequency signal, mixed by the corresponding mixer 31 or 32, over a single symbol period.

Each of the samples and ADCs 51 and 52 samples the output of the corresponding integrator 41 or 42, i.e., the integrated signal, with a symbol period, converts the sampled signal into a digital signal, and transfers the result of the conversion to the symbol detector 60.

The symbol detector 60 determines the symbol of the signal based on the data received via channel Q and channel I.

The demodulation apparatus is influenced by carrier frequency recovery error, the π/2 phase difference error of I and Q frequencies, I/Q imbalance, and ADC quantization noise, in addition to Additive White Gaussian Noise (AWGN). The noise may be analyzed as AWGN.

Next, an MPSK demodulation apparatus according to an embodiment of the present invention that determines a received symbol using a plurality of correlators in a wireless channel having a limited bandwidth, thereby reducing power consumption and improving the error performance of a system, is described in detail with reference to FIG. 2.

Figure 2:
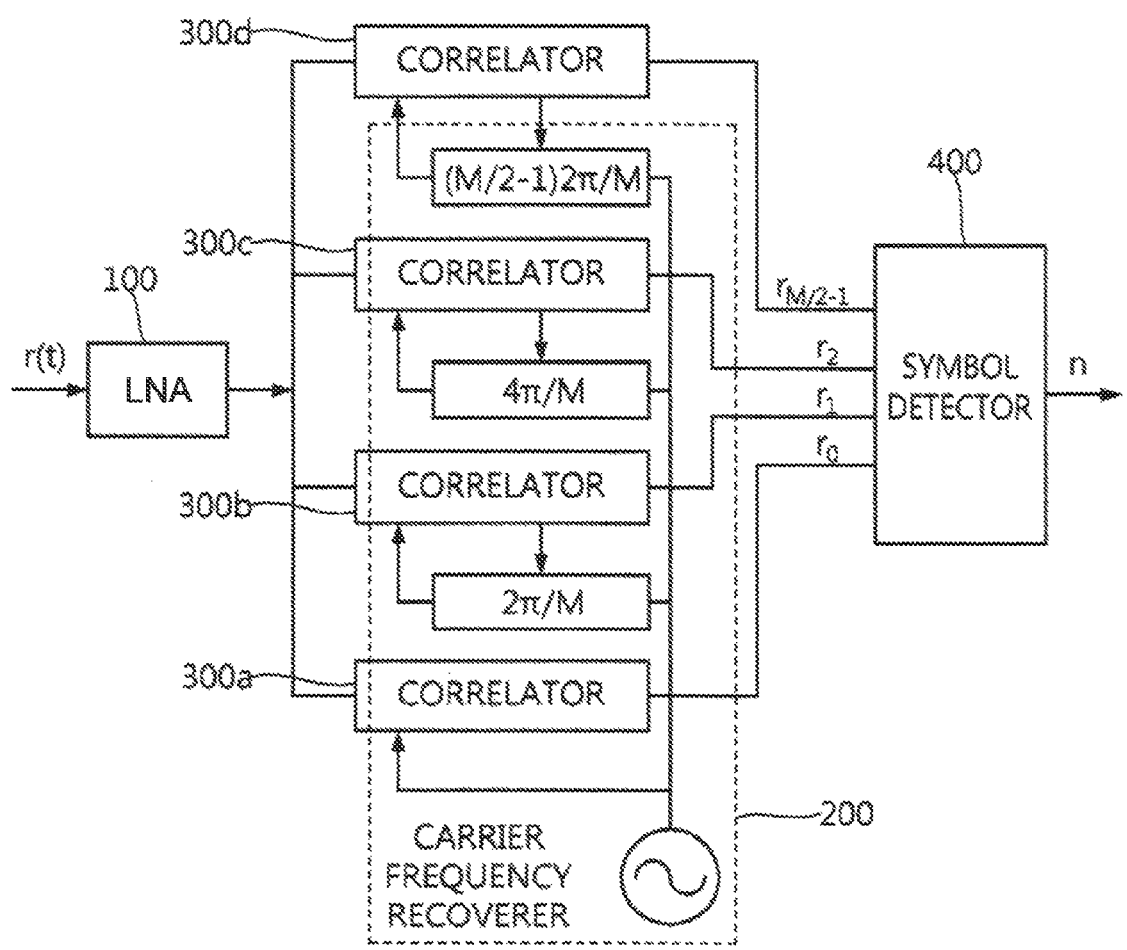
FIG. 2 is a configuration diagram schematically illustrating an MPSK demodulation apparatus according to an embodiment of the present invention.

FIG. 2 is a configuration diagram schematically illustrating an MPSK demodulation apparatus according to an embodiment of the present invention.

Referring to FIG. 2, the MPSK demodulation apparatus includes an LNA 100, a carrier frequency recoverer 200, a plurality of correlators 300a to 300d, and a symbol detector 400.

The LNA 100 amplifies a received signal r(t). In this case, the LNA 100 corresponds to a preamplifier, and employs an amplifier having a noise index lower than a reference value for the purpose of reducing the noise index of an overall receiver.

The carrier frequency recoverer 200 recovers a carrier frequency from a received signal, generates M/2 signals having a phase difference of 2π/M, and transfers the M/2 signals to the respective M/2 correlators 300a to 300d. Although it is difficult to implement the recovery of a carrier frequency at the carrier frequency recoverer 200 in the case where the frequency is high, a phase locked loop (PLL), square law loop or Costas loop circuit may be used in the case where the carrier frequency falls within a hundreds of MHz band.

Each of the plurality of correlators 300a to 300d outputs a correlated signal, maintained at a set signal level for a specific period of time, using the received signal and the carrier frequency recovered by the carrier frequency recoverer 200.

The symbol detector 400 detects a correlator corresponding to the highest signal having the highest magnitude of all the M/2 correlator output signals, and detects a received symbol based on the result of the detection.

The output of each of the plurality of correlators 300a to 300d according to the present embodiment may be divided into a signal and noise. In this case, the noise has AWGN characteristics, and may be divided into common noise existing before each correlator and individual noise generated in each correlator.

The common noise is noise generated regardless of a correlator, such as noise received from an antenna, LNA noise and the like, and the individual noise is noise generated in each correlator and noise generated independently of another correlator. The demodulation apparatus using a plurality of correlators can achieve the effect of mitigating phase error attributable to individual noise compared to a quadrature demodulation apparatus because the demodulation apparatus has a correlator in which the phase of the received symbol matches the phase of the frequency mixer.

The MPSK demodulation apparatus according to the present embodiment may be used not only as a coherent MPSK demodulation apparatus but also as a non-coherent MPSK demodulation apparatus. In this case, although a modulation apparatus may be easily implemented, performance is degraded as much as the difference between coherent error performance and non-coherent error performance.

Next, each of the plurality of correlators 300a to 300d is described in detail with reference to FIG. 3.

Figure 3:
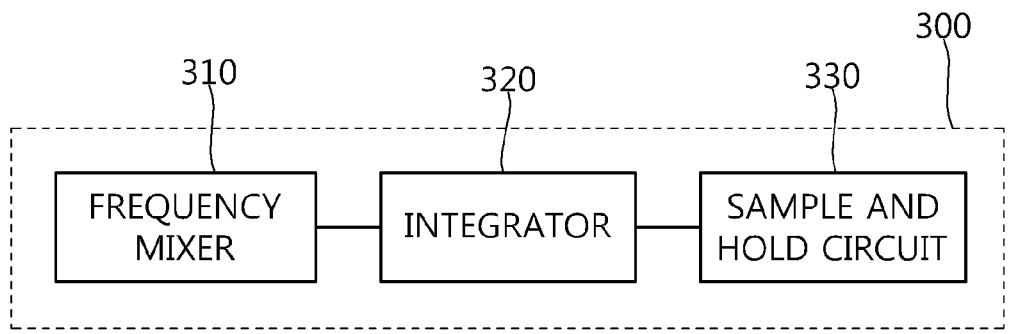
FIG. 3 is a configuration diagram illustrating a correlator according to an embodiment of the present invention.

FIG. 3 is a configuration diagram illustrating a correlator according to an embodiment of the present invention.

Referring to FIG. 3, the correlator 300 includes a frequency mixer 310, an integrator 320, and a sample and hold circuit 330.

The frequency mixer 310 mixes a received signal with a carrier frequency recovered by the carrier frequency recoverer 200, and transfers an output signal corresponding to the result of the mixing to the integrator 320.

The integrator 320 selects a low frequency signal from the output signal of the frequency mixer 310, and integrates the selected output signal over a symbol period.

The sample and hold circuit 330 samples the output signal of the integrator 320 at the time at which a symbol terminates, and maintains the result of the sampling at a set signal level for a specific period of time. In this case, the sample and hold circuit 330 according to the present embodiment may be replaced with a sample and ADC, in which case processing may be performed based on a digital signal. However, the present invention is not limited thereto. However, compared to a quadrature modulation method, this case does not achieve an energy efficiency improvement effect, but achieves a predetermined performance improvement effect.

Next, a constellation and a truth table to which the symbol detector 400 refers in order to detect a symbol are described in detail with reference to FIGS. 4 and 5.

Figure 4:
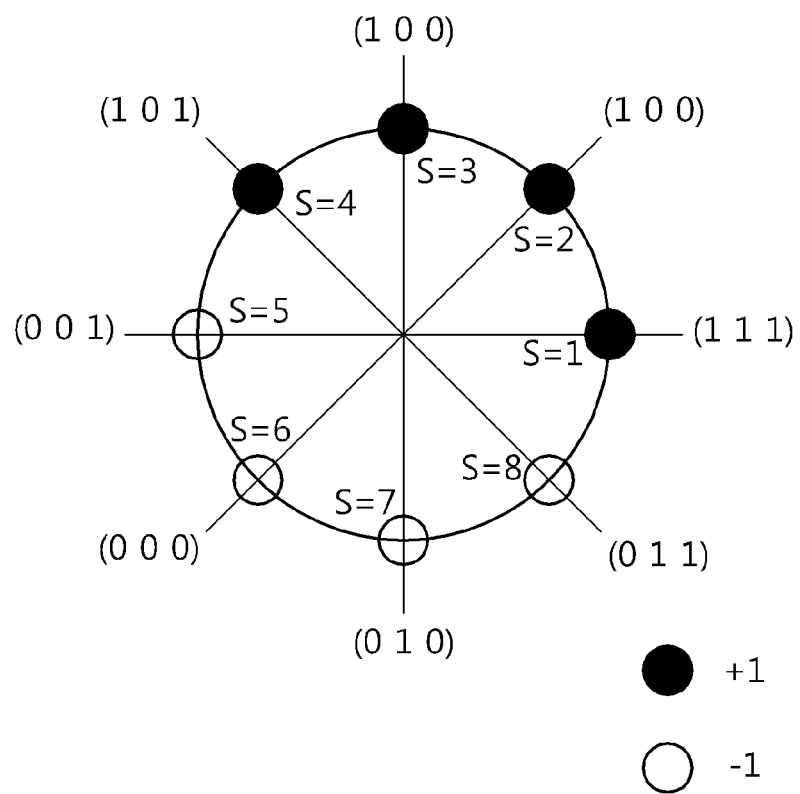
FIG. 4 is a diagram illustrating a constellation according to an embodiment of the present invention.

FIG. 4 is a diagram illustrating a constellation according to an embodiment of the present invention. Furthermore, FIG. 5 is a diagram illustrating a truth table according to an embodiment of the present invention.

FIGS. 4 and 5 illustrate examples of a constellation and a truth table that is used by the symbol detector 400 to map a symbol number to a received binary signal in 8 Phase Shift Keying (8PSK).

In 8PSK, symbols M are 8 in number, and the number of a plurality of correlators is 4(=M/2).

Referring to FIG. 4, the constellation groups three pieces of binary input into a single group, and represents the relationships between the grouped data and 8 symbols. The black color indicates that signal polarity of a corresponding correlator is +1, and the white color indicates that the signal polarity of a corresponding correlator is −1.

Referring to FIG. 5, the truth table illustrates binary inputs, symbol numbers, and carrier phases.

For example, from the truth table, it may be seen that binary input {111} has a symbol number of 0 and a phase of 0.

Next, a method by which the symbol detector 400 detects a received symbol is described in detail with reference to FIG. 6.

Figure 6:
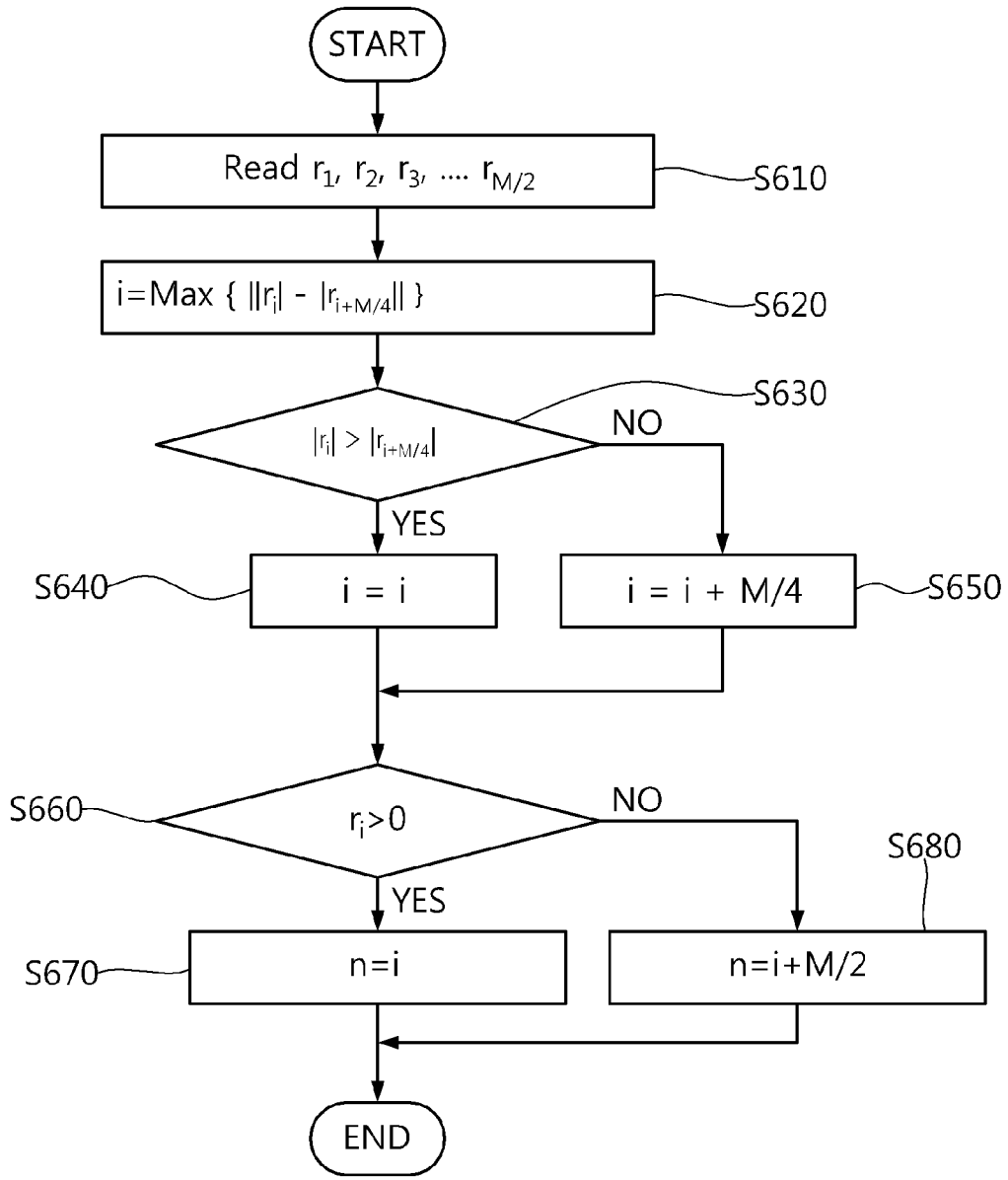
FIG. 6 is a flowchart illustrating a method of detecting a received symbol according to an embodiment of the present invention.

FIG. 6 is a flowchart illustrating a method of detecting a received symbol according to an embodiment of the present invention.

Referring to FIG. 6, the symbol detector 400 collects correlated signals from a plurality of correlators at step S610.

More specifically, the MPSK demodulation apparatus according to the embodiment amplifies a received signal r(t), recovers a carrier frequency from the amplified received signal, generates M/2 signals having phase difference 2π/M, and then transfers the M/2 signals to the respective M/2 correlators. Then, each of a plurality of correlators outputs a correlated signal, maintained at a set signal level for a specific period of time, to the symbol detector 400 using the received signal and the carrier frequency recovered by the carrier frequency recoverer 200.

The symbol detector 400 compares the absolute value magnitudes of the signals collected at step S610, and detects the number of a correlator corresponding to the highest signal $r_i$ having the highest magnitude of all the results of the comparison at step S620.

Although the step of comparing the absolute value magnitudes of signals, such as step S620, may be implemented using an analog circuit related to a low signal magnitude, the present invention is not limited thereto.

The symbol detector 400 detects the number of a correlator corresponding to the highest signal using Equation 1 below:

$$i = \text{Maxi}\{||r_i| - |r_{i+M/4}||, i \in \{0,1,2,\ldots,M/4-1\}\} \quad (1)$$

Next, the symbol detector 400 finds a correlator pair in which the difference between a quadrature component and an absolute value is largest (the absolute value signal magnitude difference between one correlator and the other correlator having a phase difference of 90 degrees is largest), as in Equation 1, and determines whether the value is a positive number at step S630. That is, the symbol detector 400 detects a correlator having a larger absolute value signal magnitude from the correlator pair having the highest absolute value signal difference.

The symbol detector 400 determines that i=i if, as a result of the determination at step S630, it is determined that the difference is a positive number, and determines that i=i+M/4 if the difference is not a positive number.

Since the quadrature component is used in Equation 1, the influence of imbalance between the correlators can be reduced, and tolerance to individual noise occurring in each of the correlators is increased, thereby improving demodulation performance compared to a conventional quadrature modulation method.

Thereafter, the symbol detector 400 determines whether the signal $r_i$ of the correlator detected at step S630 is a positive number at step S660.

If, as a result of the determination at step S660, the signal of the correlator is a positive number, the symbol detector 400 determines that a received symbol whose symbol number n corresponds to i has been received, and detects the received symbol whose symbol number n corresponds to i at step S670.

If, as a result of the determination at step S660, the signal of the correlator is not a positive number, the symbol detector 400 determines that a received symbol whose symbol number n corresponds to (i+M/2) has been received, and detects the received symbol whose symbol number n corresponds to (i+M/2) at step S680.

For example, in the case of QPSK, when it is assumed that a transmission signal is "s(t)=A cos ωt" and noise is "n(t)=$n_c$ cos ωt−$n_s$ sin ωt," a received signal is "r(t)=A cos ωt+$n_c$ cos ωt−$n_s$ sin ωt." In this case, in a conventional QPSK demodulation method, when Equation 2 is satisfied or the distance between a received signal and symbol S0 is closest, symbol S0 is determined to be a received signal.

$$-\frac{\pi}{4} < \tan^{-1}\left(\frac{r_Q}{r_I}\right) \le \frac{\pi}{4} \quad (2)$$

On the assumption that an I channel signal is "$r_I$=AT+$N_c$" and a Q channel signal is "$r_Q$=AT+$N_s$," when integration is performed over a single symbol period by referring to Equation 2, Equation 2 becomes "$|r_I|-r_Q|\ge 0$," which is represented by the signal energy of a symbol, i.e., Equation 3 below:

$$|AT+N_c|>|N_s| \quad (3)$$

Referring to Equation 3, it can be seen that a received symbol can be determined when the signal magnitude of a single period is larger than the difference between quadrature noise and in-phase noise. In MPSK, when M increases, the threshold angle of Equation 2 is reduced to $$\frac{\pi}{M}$$

and, thus, becomes sensitive to quadrature noise.

As described above, in the case of MPSK, as illustrated in FIG. 6, each received signal may be determined by comparing the outputs of the plurality of correlators 300a to 300d. This case is advantageous in that comparison can be performed using a minute signal and noise that occurs in each the correlators of the demodulation apparatus when M increases can be mitigated.

The present invention may be used not only for a coherent MPSK demodulation system but also for a non-coherent MPSK demodulation system. In this case, although a modulation apparatus may be easily implemented, performance is degraded as much as the difference between coherent error performance and non-coherent error performance.

As described above, the present invention provides an MPSK demodulation apparatus and method that determine a received symbol using a plurality of correlators in a wireless channel in which bandwidth is limited, thereby reducing power consumption and also improving the error performance of a system.

As described above, the optimum embodiments have been disclosed in the drawings and the specification. Although the specific terms have been used herein, they have been used merely for the purpose of describing the present invention, but have not been used to restrict their meanings or limit the scope of the present invention set forth in the claims. Accordingly, it will be understood by those having ordinary knowledge in the relevant technical field that various modifications and other equivalent embodiments can be made. Therefore, the true range of protection of the present invention should be defined based on the technical spirit of the attached claims.

What is claimed is:

1. An M-ary Phase Shift Keying (MPSK) demodulation method, comprising:
   collecting, by an MPSK demodulation apparatus including a plurality of correlators, output signals of the plurality of correlators; and
   detecting a received symbol by comparing absolute value magnitudes of the collected output signals,
   wherein before collecting the output signals:
   amplifying the received signal, recovering a carrier frequency from the amplified received signal, and generating a plurality of signals having a set value phase difference; and
   outputting the plurality of signals via the plurality of respective correlators.

2. The MPSK demodulation method of claim 1,
   wherein detecting the received symbol comprises:
   determining a correlator pair in which an absolute value signal difference between one correlator of the plurality of correlators and another correlator having a phase difference of 90 degrees is largest;
   determining a correlator having a higher magnitude signal by comparing a signal absolute value of the one correlator and a signal absolute value of the other correlator having a phase difference of 90 degrees, with respect to the determined correlator pair having a largest absolute value signal difference, based on a result of determining the correlator pair having a largest absolute value signal difference; and
   determining a received symbol by determining whether a signal of the correlator having a higher magnitude signal is a positive number or a negative number based on a result of determining the correlator having a higher magnitude signal.

3. The MPSK demodulation method of claim 1, wherein recovering the carrier frequency and generating the plurality of signals comprises generating the plurality of signals by applying one of a phase locked loop (PLL), a square law loop and a Costas loop to the amplified signal.

4. An MPSK demodulation apparatus, comprising:
   an amplifier configured to amplify a received signal;
   a carrier frequency recoverer configured to recover a carrier frequency from the received signal and generate a plurality of signals having a set phase difference;
   a plurality of correlators each configured to output a signal maintained at a set signal level for a specific period of time using the received signal and the plurality of signals; and
   a symbol detector configured to collect output signals of the plurality of correlators and detect a received symbol by comparing absolute value magnitudes of the collected output signals.

5. The MPSK demodulation apparatus of claim 4, wherein the symbol detector determines a correlator pair in which an absolute value signal difference between one correlator of the plurality of correlators and another correlator having a phase difference of 90 degrees is largest, determines a correlator having a higher magnitude signal by comparing a signal absolute value of the one correlator and a signal absolute value of the other correlator having a phase difference of 90 degrees, with respect to the determined correlator pair having a largest absolute value signal difference, based on a result of determining the correlator pair having a largest absolute value signal difference, and determines a received symbol by determining whether a signal of the correlator having a higher magnitude signal is a positive number or a negative number based on a result of determining the correlator having a higher magnitude signal.

6. The MPSK demodulation apparatus of claim 4, wherein the carrier frequency recoverer generates the plurality of signals using one of a PLL, a square law loop and a Costas loop.

7. The MPSK demodulation apparatus of claim 4, wherein each of the plurality of correlators comprises:
- a frequency mixer configured to mix the received signal with the carrier frequency recovered by the carrier frequency recoverer;
- an integrator configured to select a low frequency signal from an output signal of the frequency mixer and integrate the selected low frequency signal over a symbol period; and
- a sample and hold circuit configured to sample an output signal of the integrator at a time at which a symbol terminates and maintain a result of the sampling at a set signal level for a specific period of time.

8. The MPSK demodulation apparatus of claim 4, wherein the amplifier amplifies the received signal using an amplifier whose noise index is lower than a reference value.

9. The MPSK demodulation apparatus of claim 4, wherein the symbol detector detects the received symbol using a truth table and a constellation.

\* \* \* \* \*